(12) United States Patent
Hansen et al.

(10) Patent No.: US 10,065,388 B2
(45) Date of Patent: Sep. 4, 2018

(54) METHOD FOR MANUFACTURING HOLLOW PROFILES, AND HOLLOW PROFILE

(71) Applicant: BENTELER AUTOMOBILTECHNIK GMBH, Paderborn (DE)

(72) Inventors: Kathy Hansen, Tonder (DK); Edvin List Clausen, Lojt Kirkeby Abenra (DK)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 604 days.

(21) Appl. No.: 14/577,627

(22) Filed: Dec. 19, 2014

(65) Prior Publication Data
US 2015/0174852 A1 Jun. 25, 2015

(30) Foreign Application Priority Data

Dec. 23, 2013 (DE) .................. 10 2013 114 789

(51) Int. Cl.
*F16B 35/04* (2006.01)
*B32B 1/00* (2006.01)
(Continued)

(52) U.S. Cl.
CPC .............. *B32B 1/00* (2013.01); *B23K 31/02* (2013.01); *B32B 15/20* (2013.01); *B32B 37/12* (2013.01); *B32B 37/142* (2013.01); *B62D 21/00* (2013.01); *B62D 25/00* (2013.01); *F16B 7/00* (2013.01); *F16B 35/00* (2013.01);
(Continued)

(58) Field of Classification Search
None
See application file for complete search history.

(56) References Cited

U.S. PATENT DOCUMENTS 3,878,802 A * 4/1975 Schmitt .................. H02K 5/04
29/521
3,935,555 A * 1/1976 Nishioka ................ H01C 10/14
338/130

FOREIGN PATENT DOCUMENTS

DE           102 40 793 A1    8/2002
DE    10 2012 022 876 A1    11/2012
DE    20 2013 002 553 U1    3/2013

OTHER PUBLICATIONS

English machine translation of DE 102012022876 dated Jun. 20, 2017.*

* cited by examiner

*Primary Examiner* — Adam Krupicka
(74) *Attorney, Agent, or Firm* — Sheridan Ross P.C.

(57) ABSTRACT

The invention relates to a method for manufacturing hollow profiles, having the following method steps: providing an initial hollow profile which in an insertion wall and optionally in at least one intermediate wall displays an insertion opening, providing a support element which displays a bolt element, an engagement element, and support walls which are disposed between the bolt element and longitudinal flanks, passing through the support element through the insertion opening until the support walls are positioned in the initial hollow profile, engaging a tool on the engagement element, rotating the support element by means of the tool until regions of the longitudinal flanks touch inner walls of the initial hollow profile, connecting the regions of the longitudinal flanks to the initial hollow profile via the inner walls.

18 Claims, 7 Drawing Sheets

(51) Int. Cl.
*B23K 31/02* (2006.01)
*B32B 15/20* (2006.01)
*B32B 37/12* (2006.01)
*B32B 37/14* (2006.01)
*F16B 35/00* (2006.01)
*B62D 21/00* (2006.01)
*B62D 25/00* (2006.01)
*F16B 7/00* (2006.01)

(52) U.S. Cl.
CPC ..... *B32B 2605/08* (2013.01); *Y10T 29/49963* (2015.01); *Y10T 428/12* (2015.01); *Y10T 428/13* (2015.01)

METHOD FOR MANUFACTURING HOLLOW PROFILES, AND HOLLOW PROFILE

CROSS-REFERENCE TO RELATED APPLICATIONS

This application claims the benefit of German Patent Application No. DE 10 2013 114 789.5 filed Dec. 23, 2013, the entire contents of which are incorporated herein by reference.

FIELD

The invention relates to a method for manufacturing a hollow profile having a support element.

BACKGROUND

Hollow profiles are used in a wide range of applications in the automotive sector, in particular as structural components or suspension components which have to be of high strength, on the one hand, but also be highly resistant to dynamic loads, on the other, in particular as longitudinal members and/or cross members within a vehicle body. Dynamic loading arises in particular in a localized manner here when said hollow profiles are coupled to suspension components.

Such hollow profiles are increasingly extruded. In order to increase rigidity in the region where components are coupled, such hollow profiles which are configured as structural components in their cavities often display support elements which may optionally be perpendicular to the longitudinal extent of said hollow profiles and which are made of metal. Such support elements are typically manufactured as continuous cylindrical bushes which are introduced into the hollow profile and fastened there. However, bushes of this type impart only limit rigidity, in particular in the case of loading which is induced into the support elements in a transverse manner to the member.

Apart from such continuous bushes, hollow profiles may even also be provided with external linkages which are configured as forks or embracing belts. However, in the case of such external reinforcements the problem arises that space has to be available for this purpose outside the hollow profile. In addition, a significantly higher weight is also associated with such external reinforcements, with performance often also not being satisfactory. Finally, buckle formation in the event of a crash may also be influenced in a negative manner by such external linkages, since the member cannot buckle in the region of the reinforcement.

SUMMARY

It is thus an object of the invention to provide a method for manufacturing hollow profiles in which support elements having high rigidity can be introduced into initial hollow profiles in a constructively simple and cost-effective manner, wherein a reinforcement is attainable in particular in the direction which is transverse to the longitudinal extent of the hollow profile, such that such hollow profiles display a particularly good resistance to dynamic loading. A further object of the invention is to provide hollow profiles of this type.

This object is achieved by a method having all features of Patent claim 1, and by a hollow profile having all features of Patent claim 6. Advantageous design embodiments of the invention are to be found in the subclaims.

The method according to the invention for manufacturing hollow profiles is distinguished by the following method steps:

providing an initial hollow profile which in an insertion wall and optionally in at least one intermediate wall displays an insertion opening, providing a support element which displays a bolt element, an engagement element, and support walls which are disposed between the bolt elements and longitudinal flanks, passing through the support element through the insertion opening until the support walls are positioned in the initial hollow profile and until a positioning element of the support element communicates with a positioning receptacle (3), engaging a tool on the engagement element, rotating the support element by means of the tool until regions of the longitudinal flanks touch inner walls of the initial hollow profile, connecting the regions of the longitudinal flanks to the initial hollow profile via the inner walls.

On account of the method according to the invention it is made possible to provide in a simple manner hollow profiles having particularly high dynamic rigidity in the coupling areas. Proceeding from an initial hollow profile which is prefabricated in such a manner that it displays an insertion opening for a support element on an insertion wall and, if the hollow profile is a multiple-chamber hollow profile, on the intermediate walls separating the individual hollow chambers. The support element here is composed of a bolt element, an engagement element, support walls, and longitudinal flanks, whereby the support walls are disposed between the longitudinal flanks and the bolt element. The insertion opening here advantageously displays a shape which substantially corresponds to the cross section of the support element, wherein the shape of the insertion opening is marginally larger than the cross section of the support element, such that the support element can be inserted in a simple manner through the insertion opening into the hollow profile. The support element is displaced into the desired position in the hollow profile. It is now possible to engage on the engagement element by means of a tool, such that the former can be rotated by means of the tool. This rotation of the support element by means of the tool is performed until regions of the longitudinal flanks of the support element touch inner walls of the initial hollow profile. To conclude, connection of the regions of the longitudinal flanks which touch the inner walls of the initial hollow profile to the initial hollow profile is now performed. By means of the support walls and their connection to the inner walls of the hollow profile, induced forces, in particular highly dynamic forces such as arise when the support element is coupled in particular to suspension components, can be distributed in a targeted manner across a large area, and elastic or even plastic localized deformations of the hollow profile can thus be avoided.

In principle, it is also to be understood here that touching of the inner walls of the initial hollow profile by the regions of the longitudinal flanks described in step e) includes the fact that a spacing exists between these regions of the longitudinal flanks and the inner walls, wherein said spacing is, however, sufficiently small to enable welding of the regions of the longitudinal flanks to the inner walls from outside the hollow profile. In particular, this spacing is smaller than or equal to the quadruple wall thickness of the initial hollow profile, wherein the wall thickness is between approx. 1.5 mm and 8 mm, preferably between 2 mm and 5.5 mm, and particularly preferably between 2.5 and 4.5 mm.

In principle, the inner walls here are to be understood to be all inner walls, since a plurality of support elements which optionally display various orientations in respect of their longitudinal extent within the initial hollow profile also may be received in the initial hollow profile.

A positioning element with the aid of which the support element may be fixed or secured, respectively, so as not to be displaced prior to rotation thereof may advantageously be provided on the support element. This may be understood to include, for example, a positioning element which is disposed on the end of the support element, which is first guided through the insertion opening of the insertion wall, and which correspondingly communicates with a positioning receptacle in a positioning wall of the initial hollow profile in such a manner that the positioning element is securely held in the positioning receptacle. The positioning receptacle here may also be configured as a corresponding positioning opening within the positioning wall. On the other hand, in the case of a multi-chamber profile, one or more insertion openings within the intermediate walls may also serve as positioning elements. The geometry of the insertion openings here is at least in part configured in such a manner that the insertion openings with their delimiting walls terminate so as to be substantially flush with the bolt of the support element, and thus secure guiding of the support element while the support element is inserted into the initial hollow profile, so that said support element is guided into the desired position for rotation. According to another design embodiment of the invention the positioning element may also be configured as an opening in the support element into which a positioning receptacle in the form of a bolt or pin engages.

It is particularly advantageous in the case of the method according to the invention that initial hollow profiles which display only marginal clearances in the form of the insertion openings or positioning openings, respectively, may be used here, such that the initial stability of said initial hollow profiles is only minimally weakened in the case of axial loading. The support elements can be inserted in a targeted manner by way of these insertion openings and then be correspondingly rotated until they occupy their supporting position in which they are received in the initial hollow profile, preferably in a form-fitting manner. By way of positioning the positioning element of the support element it is additionally achieved in a simple manner that the support elements can be positioned in the desired position within the hollow profile in a very simple but also very reliable manner. No special tools whatsoever, except for the tool for rotating the support element which can be configured as a simple wrench, are required in order to achieve the form-fit between support elements and hollow profiles. The reliable form-fit between support element and hollow profile is nevertheless ensured on account of the method according to the invention.

According to a particular concept of the invention, it has proven advantageous that the connection of the regions of the longitudinal flanks of the support element which touch the inner walls of the initial hollow profile to the initial hollow profile takes place in a materially integral manner, for example by welding or adhesive bonding. On account of such a materially integral connection, support element and initial hollow profile are connected such that this connection is particularly stable, wherein the hollow profile manufactured in this manner displays the desired deformation and energy-dissipation properties and the influence on the buckle formation by the member in the event of a crash is minimal.

The connection may also take place in such a manner that at least localized embossing of the initial hollow profile takes place, wherein here at least one inner wall of the initial hollow profile in the region of the embossing is brought into contact with regions of the longitudinal flanks.

To the extent that the materially integral connection here takes place by means of adhesive bonding, a corresponding adhesive is applied prior to introduction of the support element onto the longitudinal flanks thereof, or onto the regions of the longitudinal flanks which touch the inner walls of the initial hollow profile in the supporting position thereof, respectively. In the case of employment of an extruded profile as an initial hollow profile, subsequent hot age-hardening in order to increase the strength properties may at the same time be used to cure the adhesive.

To the extent that a connection is to take place by welding, the latter may take place as a final connection method from outside the hollow profiles, once the regions of the longitudinal flanks already touch the inner walls of the initial hollow profile.

According to a further concept of the invention, the positioning element and/or the engagement element are/is also connected to the initial hollow profile in a materially integral manner, for example by welding or adhesive bonding, or in a force-fitting manner, for example by way of threaded means. This measure also once again increases the stability of the connection between support element and initial hollow profile, such that the hollow profile manufactured in this manner displays the desired properties with respect to stability and deformation and energy-dissipation properties.

In order to connect a positioning element which is disposed on the end of the support element which is first guided through the insertion opening of the insertion wall to the initial hollow profile, welding may again take place from outside by way of welding through the wall of the initial hollow profile in the region of the positioning element or of embossing of the initial hollow profile.

The design embodiment of the invention in which for centring the support element a receptacle part, by way of a centring assembly, is placed upon the engagement element of the support element, and subsequently this receptacle part is connected to the initial hollow profile in a materially integral manner, for example by welding or adhesive bonding to the insertion wall of the initial hollow profile, is also aimed in the same direction. The receptacle part has a positive effect on the induction of load, in particular when the hollow profile is coupled to dynamically highly stressed components, because the forces are induced into the entire hollow profile in a more uniform and more planar manner.

The hollow profile according to the invention, which is preferably manufactured according to one of the methods described above, displays an initial hollow profile and at least one support element. The support element here displays one bolt element, one engagement element, and support walls which are disposed between the bolt element and longitudinal flanks, wherein regions of the longitudinal flanks are connected to the initial hollow profile via inner walls, preferably in a force-fitting and/or materially integral manner.

The support element here advantageously displays a positioning element which may be disposed in a positioning receptacle of the initial hollow profile and which is connected to the latter in a force-fitting and/or materially integral manner, for example by welding or adhesive bonding. The design embodiment of such positioning elements and of such positioning receptacles has already been further described above in the context of the method according to the invention.

It has been demonstrated to be advantageous here that the engagement element of the support element in the region of an insertion opening of an insertion wall of the initial hollow profile is connected to the initial hollow profile in a force-fitting and/or materially integral manner, for example by welding or adhesive bonding to the insertion wall of the initial hollow profile. Furthermore, for centring the support element and for transferring load away from the support element, a receptacle part which is geometrically adapted to the engagement element is placed upon the engagement element, and the receptacle part is connected to the initial hollow profile in a force-fitting and/or materially integral manner, for example by welding or adhesive bonding to the insertion wall of the initial hollow profile.

According to a further concept of the invention, the initial hollow profile here is configured as a single-chamber hollow profile.

Alternatively, the hollow profile may, of course, also be configured as a multiple-chamber hollow profile, in particular as a dual-chamber hollow profile, wherein particularly preferably at least one intermediate wall substantially runs in a horizontal plane.

The longitudinal flanks of the support element preferably display a bevel. By means of this bevel it is made possible that during manufacturing of a hollow profile according to the invention the support elements can be rotated in a particularly simple manner within the initial hollow profile, until regions of the longitudinal flanks of the support elements touch inner walls of the initial hollow profile. This is of advantage in particular when the longitudinal flanks of the support element extend away from the support walls of the support element, both to the right and to the left. On account of these bevels it is made possible that no load whatsoever, in particular stress load, arises on the support element or the initial hollow profile, respectively, during rotation, until the regions of the longitudinal flanks of the support elements touch the inner walls of the initial hollow profile in a fully planar manner. On account of a design embodiment of this type, edge-tilting of the support element during rotation in the initial hollow profile is also avoided during manufacturing of the hollow profile according to the invention.

According to a further concept of the invention, the initial hollow profile is configured as a rectangular profile having an interior width which corresponds to an effective support width of the support element. On account of this design embodiment it is ensured that the support elements are received in a form-fitting manner in the hollow profile, such that an effective materially integral and/or force-fitting connection of the support elements to the initial hollow profile can be carried out.

Furthermore, it has proven meaningful for the initial hollow profile to be composed of an aluminium alloy of the 6xxx or 7xxx group according to DIN EN 573-4.

Further objectives, advantages, features and application potentials of the present invention are derived from the following description of exemplary embodiments by means of the drawings. Here, all described and/or illustrated features individually or in any meaningful combination form the subject matter of the present invention, also irrespective of their context in the claims or of what said claims refer back to.

DETAILED DESCRIPTION

Figure 1:
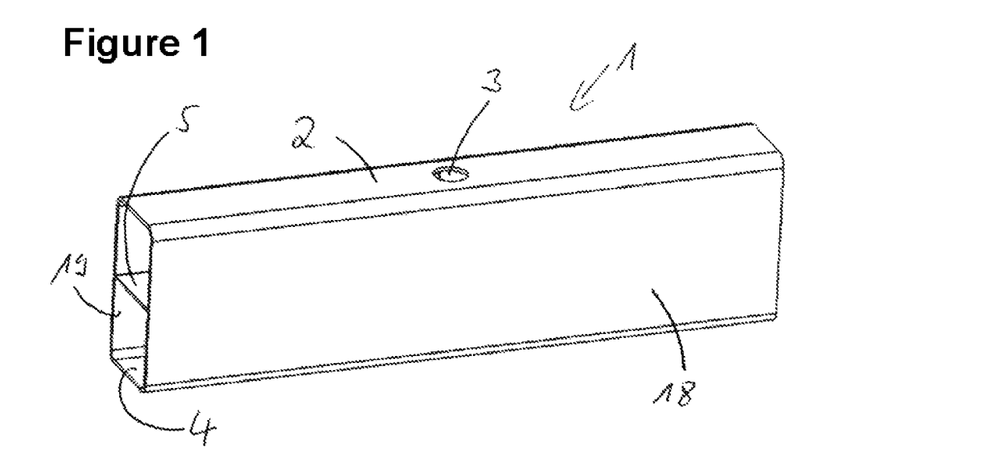
FIG. 1 shows a potential embodiment of an initial hollow profile of a hollow profile according to the invention, in a perspective view from below.

FIG. 1 shows an initial hollow profile 1 for a hollow profile according to the invention, which is configured as a dual-chamber profile. The initial hollow profile 1 here is also configured as a rectangular hollow profile which displays a first side wall 18 and a second side wall 19 and a positioning wall 2 and insertion wall 4 which interconnect the side walls 18, 19. Additionally, an intermediate wall 5 is also disposed between the side walls 18 and 19 in the interior of the initial hollow profile 1. FIG. 1 shows this initial hollow profile 1 in a perspective view from above, such that a positioning opening 3 for a positioning element 8 of a support element 7, which has been introduced into the positioning wall 2, can be identified.

Figure 2:
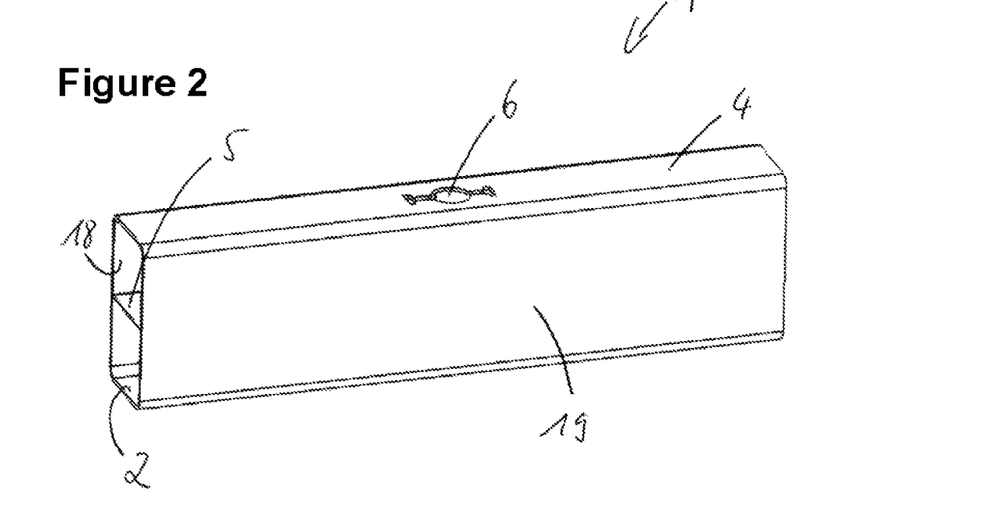
FIG. 2 shows the initial hollow profile according to FIG. 1, in a perspective view from above.

FIG. 2 shows the initial hollow profile 1 of FIG. 1 now in a perspective view from above. Here, an insertion opening 6 which is disposed in the insertion wall 4 can be identified.

Figure 3:
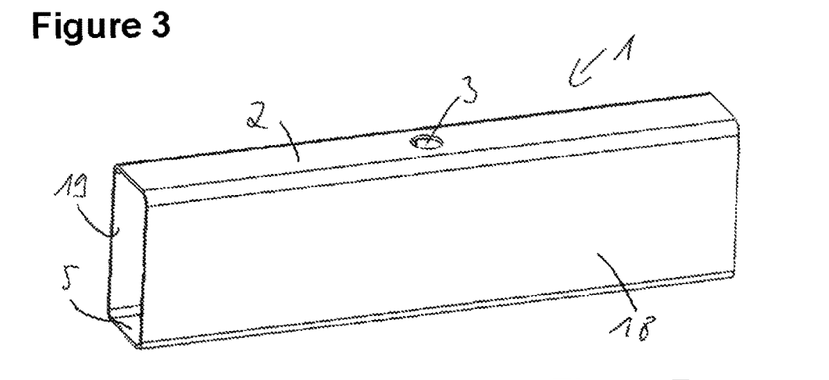
FIG. 3 shows a further exemplary embodiment of an initial hollow profile of a hollow profile according to the invention, in a perspective view from below.

FIG. 3 now shows another initial hollow profile 1 which is configured as a single-chamber hollow profile and as a rectangular hollow profile. Except for the intermediate wall 5 of the initial hollow profile 1 of FIGS. 1 and 2, this initial hollow profile corresponds to the initial hollow profile 1 there.

In FIGS. 4 to 7, various exemplary embodiments of support elements 7, which can be inserted into the initial hollow profile 1 through the insertion opening 6, are now illustrated.

Figures 4, 5, 6:
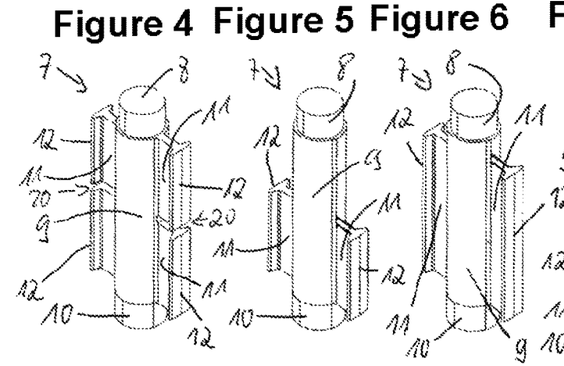
FIGS. 4 to 7 show various exemplary embodiments of a support element of a hollow profile according to the invention.

The support element 7 of FIG. 4 here displays a bolt element 9, on the upper end of which a positioning element 8 and on the lower end of which an engagement element 10 for a tool are disposed. Furthermore, this support element 7 displays four support walls 11 which, on the one hand, are connected to the bolt element 9 and, on the other hand, to longitudinal flanks 12. Here, in each case two support walls 11 are disposed so as to be opposite one another on the bolt element 9, and two support walls 11 are disposed so as to be spaced apart by way of an intermediate space 20 on the same side of the bolt element 9. The intermediate spaces 20 serve there to enable rotation of support element 7 within the initial hollow profile 1 after introduction of the support element 7 into a dual-chamber hollow profile, such as illustrated in FIGS. 1 and 2, so that the intermediate wall 5 is received in the intermediate spaces 20. This is yet to be described in more detail by means of further figures.

FIG. 5 shows a support element 7 corresponding to the support element 7 of FIG. 4, wherein, however, only two support walls 11 which extend across about half of the longitudinal extent of the bolt element 9 and are disposed so as to be opposite one another on the bolt element 9 are provided. Also here, the support walls 11 again display longitudinal flanks 12. This exemplary embodiment in particular takes into account non-symmetrical load inductions, such as arise on account of coupling the support element to further components, in particular dynamically highly stressed suspension components. FIG. 6 shows a support element 7 corresponding to the support element 7 of FIG. 5, wherein the two support walls 11 now extend substantially across the entire longitudinal extent of the bolt element 9.

Figure 7:
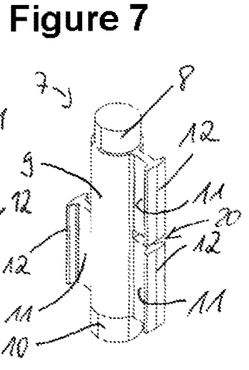

In contrast, the support element 7 of FIG. 7 now displays three support walls 11, wherein only one support wall 11 is disposed on one side of the bolt element, while two support walls 11 which are spaced apart by way of an intermediate space 20 are again disposed on the other side. Again, these support walls 11 also display longitudinal flanks 12. This may prove advantageous when further restrictions, such as limitations in installation space, or non-symmetrical load inductions arise.

All support elements 7 of FIGS. 4 and 7 display a positioning element 8 on the one end of the bolt element 9. This element/assembly may also be executed as a bore, in order to receive a positioning receptacle in the form of an auxiliary tool for centring. On the other end, the bolt element 9 displays an engagement element 10 for a tool. The engagement element 10 serves to enable rotation of the support element 7 after the latter has been inserted via the insertion opening 6 into the initial hollow profile 1 and the support element 7 has been rotatably fixed by way of the positioning element 8 in the positioning opening 3 of the positioning wall. Here, after rotation of the support element 7, the longitudinal flanks 12 serve for at least in portions coming into contact with inner walls 14 of the side walls 18 and 19, such that said longitudinal flanks 12 can be connected there to the initial hollow profile 1 in a materially integral and/or force-fitting manner.

Figure 8:
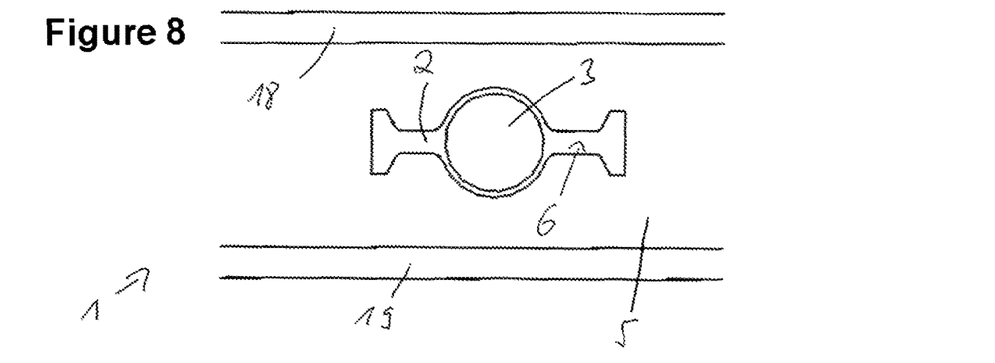
FIG. 8 shows a cross-sectional illustration of a multiple-chamber hollow profile according to the invention.

In FIG. 8, a cross-sectional illustration of a multiple-chamber hollow profile according to the invention, in which an intermediate wall 5 interconnects the side walls 18 and 19 of the initial hollow profile, is now illustrated. An insertion opening 6 is disposed in the intermediate wall 5 as in the insertion wall 4 (not illustrated here), such that the positioning wall 2 having its positioning opening 3 of the initial hollow profile 1 is identifiable through this entry opening 6.

Figures 9, 10, 11:
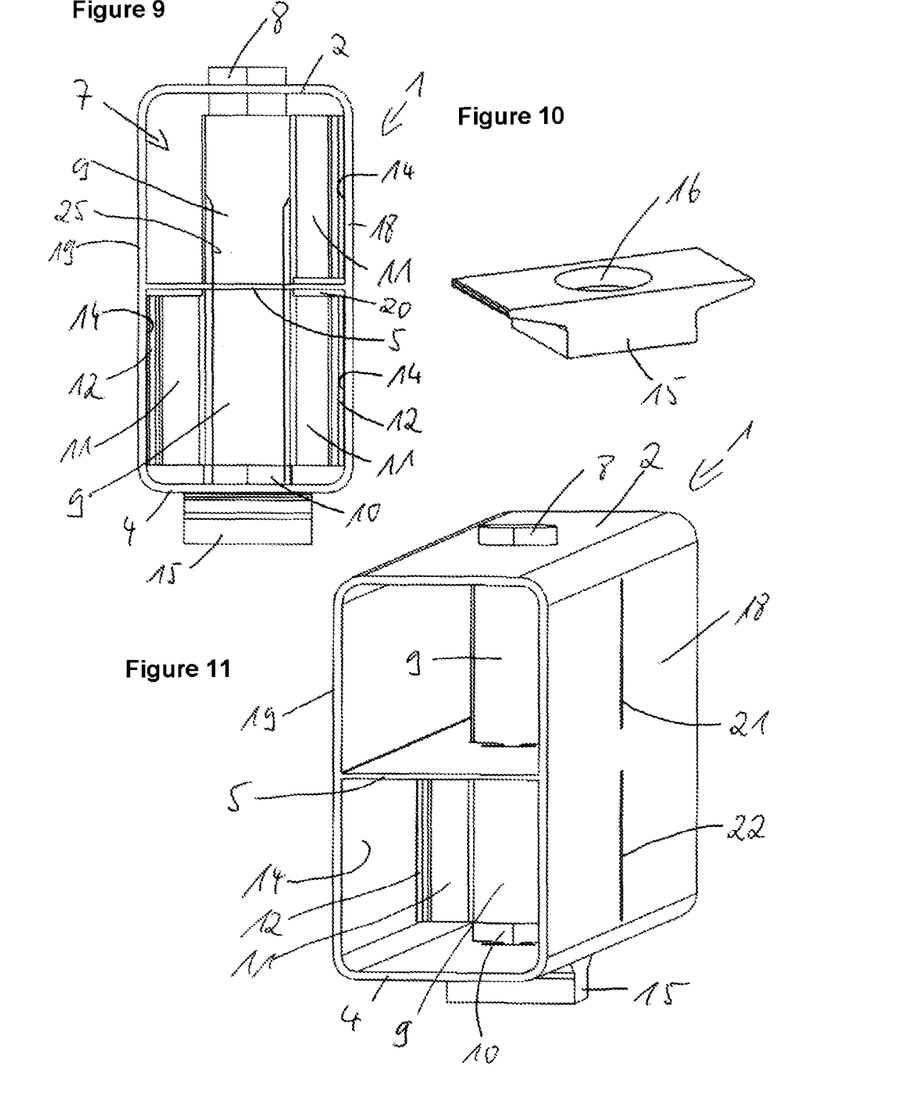
FIG. 9 shows an exemplary embodiment of a hollow profile according to the invention, in a cross-sectional illustration.
FIG. 10 shows an exemplary embodiment of a receptacle part of a hollow profile according to the invention, in a perspective view.
FIG. 11 shows the hollow profile according to the invention according to FIG. 9, in a perspective view.

FIG. 9 now shows an exemplary embodiment of a hollow profile according to the invention, in a cross-sectional illustration, wherein a support element 7 according to FIG. 7 is disposed in the initial hollow profile 1. The initial hollow profile there is again configured as a dual-chamber hollow profile, wherein the side walls 18 and 19 of the insertion wall 4 and of the positioning wall 2 are interconnected by an intermediate wall 5. Here, the support element 7 has already been guided through the insertion openings 6 of the intermediate wall 5 and of the insertion wall 4 and by way of its positioning element 8 has been rotated in the positioning opening 3 into a position in which the longitudinal flanks 12 of the support walls 11 touch inner walls 14 of the side walls 18 and 19 of the initial hollow profile. Here, the longitudinal flanks 12 are already connected to the initial hollow profile in a materially integral manner by welding to the inner walls 14 of the side walls 18 and 19. In this exemplary embodiment, coupling in particular to a suspension component is made possible by means of a screw connection by way of an internal thread 25 in the engagement element 10 of the support element 7. Here, in the region of the engagement element 10, the bolt element 9 of the support element 7 in the direction of its longitudinal extent is provided with a blind hole.

It may be further derived from the illustration of FIG. 9 that a receptacle part 15 is already placed upon the engagement element 10 of the support element in such a manner that the engagement element 10 is received in a centring opening 16 of the receptacle part 15. The receptacle part 15 here is likewise connected to the insertion wall 4 of the initial hollow profile 1 in a materially integral manner by way of welding, while the engagement element 10 is received in the centring opening 16 of the receptacle part 15 in at least a form-fitting manner. Optionally, the engagement element 10 may also be connected to the receptacle part 15 in a materially integral manner, for example by adhesive bonding or welding prior to or after insertion of the support element 7 through the insertion wall 4.

In FIG. 10, the receptacle part 15 with its centring opening 16 is shown in a perspective illustration.

FIG. 11 shows the hollow profile according to the invention of FIG. 9, now in a perspective illustration. Welded connections 21 and 22, which are disposed on the side wall 18 and by means of which the side wall 18 of the initial hollow profile 1 by way of its inner face 14 is connected in a materially integral manner to the flanks 12 of the support element 7, can be particularly well identified here.

Figure 12:
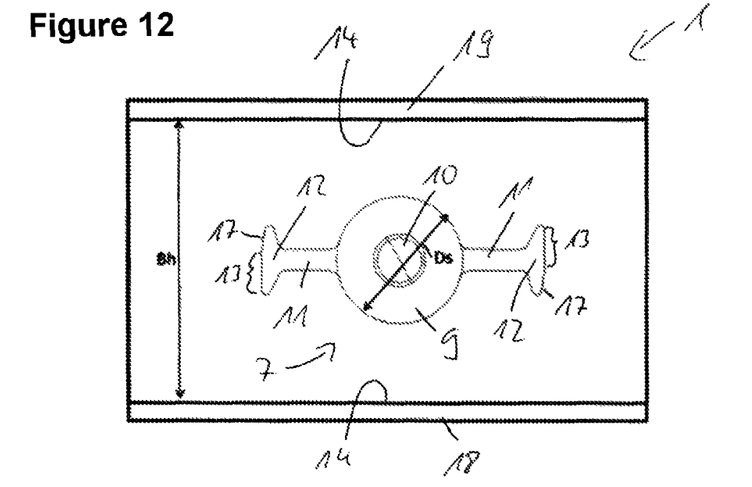
FIG. 12 shows an exemplary embodiment of a hollow profile according to the invention during manufacturing of the same, after insertion of the support element into the initial hollow profile, in a cross-sectional illustration.
Figure 13:
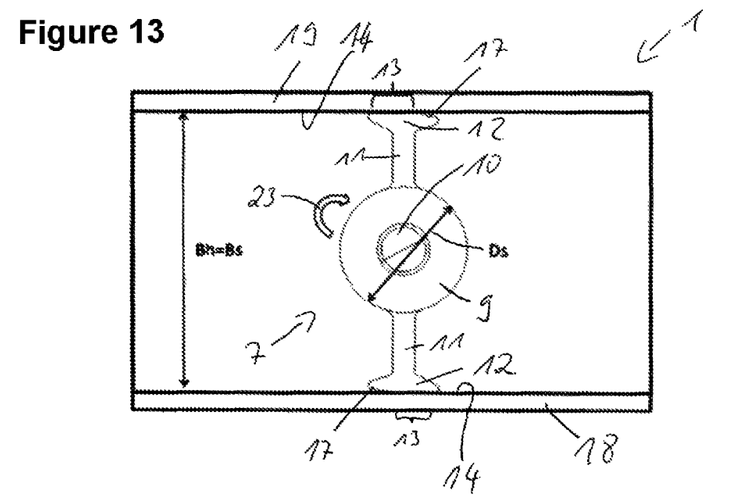
FIG. 13 shows the hollow profile according to FIG. 12, after rotation of the support element within the hollow profile, in a cross-sectional illustration.

FIGS. 12 and 13 clarify the manufacturing process of a hollow profile according to the invention. Here, a support element 7 is inserted via the insertion opening of the insertion wall 4 into the initial hollow profile 1 in such a manner that the support walls 11 of the support element 7 extend in the direction of the longitudinal extent of the initial hollow profile 1. The insertion opening 6 here substantially displays the same shape as the cross section of the support element in the region of the support walls 11, whereby, however, the former is marginally larger in order to make inserting of the support element possible in a smooth-running manner. Longitudinal flanks 12, which extend away from both sides of the support walls 11, are disposed here on the support walls 11. These longitudinal flanks 12 here display a region 13 which is configured so as to touch the inner walls 14 of the side walls 18 and 19 of the initial hollow profile 1 in a fully planar manner. The materially integral connection of the support element 7 to the initial hollow profile 1 subsequently takes place on these regions 13. The initial hollow profile 1 here displays an interior width Bh which substantially corresponds to the support width Bs of the support element 7. This is particularly well evident in FIG. 13 in particular, after the support element has been rotated in the clockwise direction according to the direction of rotation 23. The longitudinal flanks 12 here in the region 13 are touched by the inner walls 14 of the side walls 18 and 19 of the initial hollow profile in a fully planar manner. The bolt 9 which carries the side walls 11 here displays a diameter Ds. The engagement element 10 for the tool is furthermore disposed on the bolt 9.

During rotation of the support element 7 within the initial hollow profile 1, the longitudinal flanks 12 with a bevel 17 slide along the inner walls 14 of the side walls 18 and 19, until the regions 13 of the longitudinal flanks 12 bear on the inner walls 14 in a fully planar manner. Once this position according to FIG. 13 has been reached, the regions 13 are then to be welded from the outside of the initial hollow profile 1 to the inner walls 14, such that a hollow profile according to the invention is created.

Figure 14:
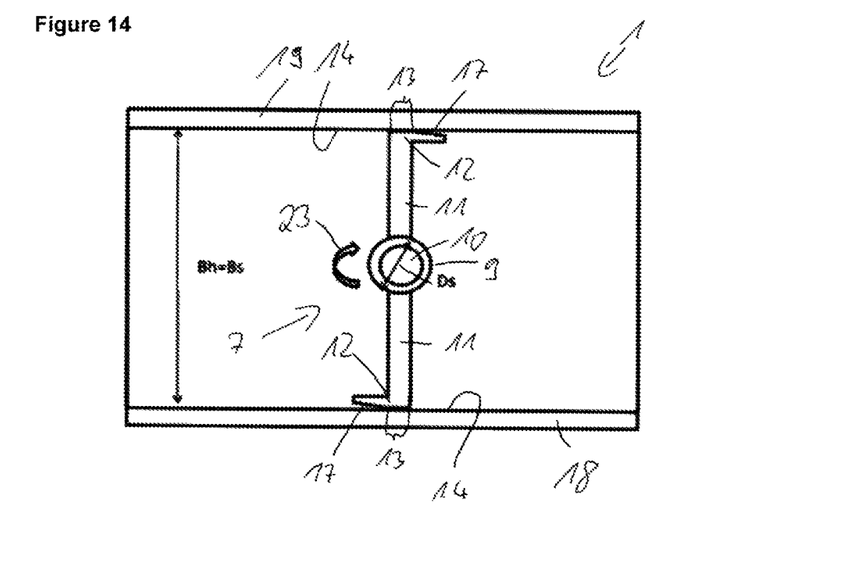
FIG. 14 shows a further exemplary embodiment of a hollow profile according to the invention, having another support element, in a cross-sectional illustration.

In FIG. 14, another exemplary embodiment of a hollow profile according to the invention is illustrated. The contrast in relation to the exemplary embodiment of FIGS. 12 and 13 lies substantially in that another support element 7 is used here. It can also be identified here that the support element 7 is configured as a hollow profile. This may contribute towards optimizing weight.

The support element 7 of the hollow profile of FIG. 14 indeed also displays a support width Bs which corresponds to the interior width Bh of the initial hollow profile 1. However, the longitudinal flanks 12 of the support element 7 here are configured in a different manner. These support flanks 12 extend away from the support walls 11 in only one direction, such that the regions 13 of the longitudinal flanks 12 now substantially correspond to a termination wall of the longitudinal walls 11. However, these longitudinal flanks 12 again also display bevels 17 which, during rotation of the support element 7 within the initial hollow profile 1, slide along the inner faces 14 until the regions 13 of the longitudinal flanks 12 bear on the inner walls 14 in a fully planar manner.

Figure 15:
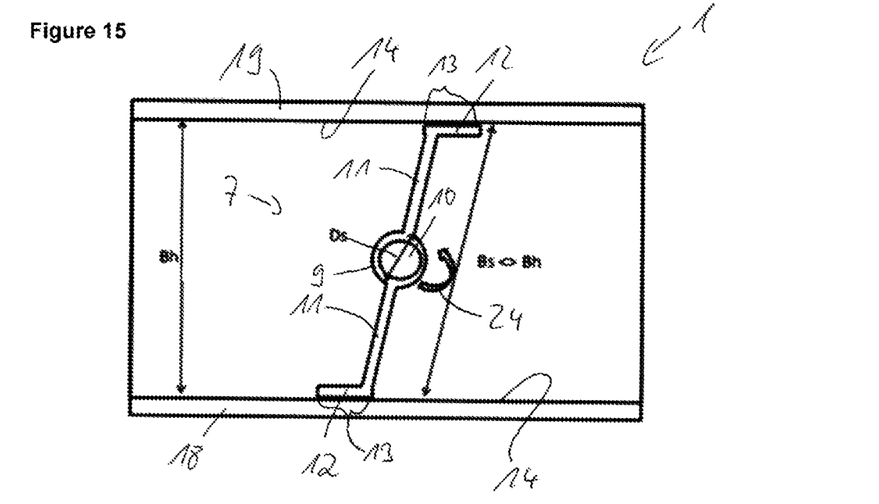
FIG. 15 shows a further exemplary embodiment of a hollow profile according to the invention, having yet another support element, in a cross-sectional illustration.

Whilst in the case of the exemplary embodiments of FIGS. 12 to 14 the support elements 7 there in their end position, by way of their support walls 11, stand in a substantially perpendicular manner on the outer walls 18 and 19 of the initial hollow profile 1, FIG. 15 shows a further exemplary embodiment in which this is not the case. The support element 7 there here displays a support width Bs which is larger than the interior width Bh of the initial hollow profile 1.

Longitudinal flanks 12 which display a region 13 which can be touched by the inner walls 14 of the side walls 18 and 19 of the initial hollow profile in a fully planar manner are disposed on the support walls 11 of the support element there, wherein the region 13 extends across the entire longitudinal extent of the longitudinal flanks 12. The support element 7 here, in order to touch the regions 13 on the inner faces 14, is not rotated in the clockwise direction but in the anti-clockwise direction. This direction of rotation 24 here is illustrated in the form of an arrow. An embodiment such as the exemplary embodiment of FIG. 15 is particularly suited to adhesive connection between longitudinal flanks 12 and inner walls 14.

Figure 16:
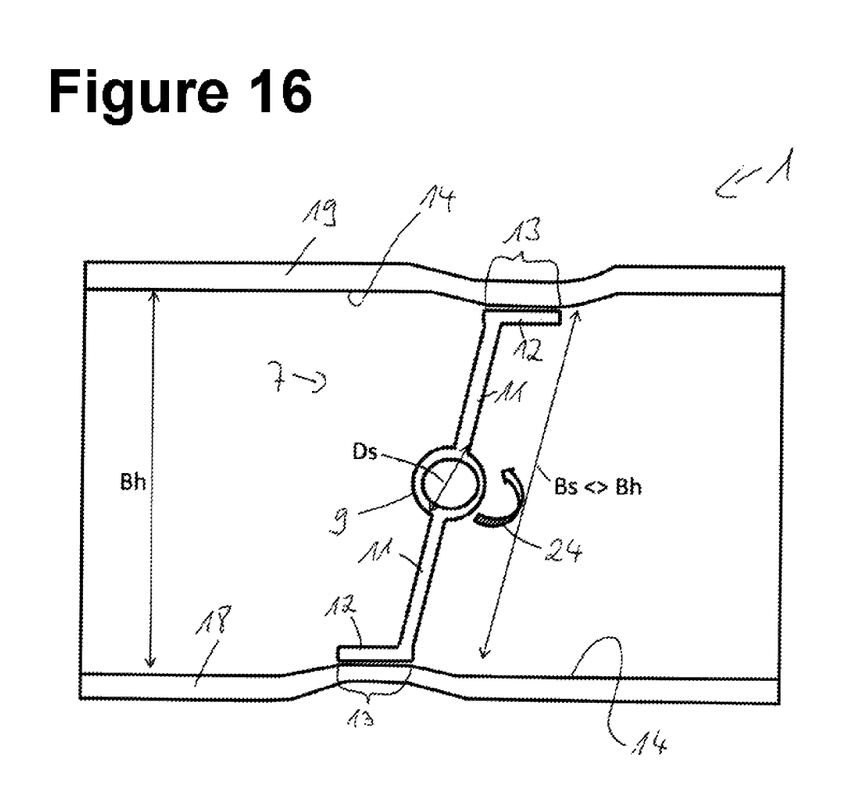
FIG. 16 shows a further exemplary embodiment of a hollow profile according to the invention during manufacturing of the same, after insertion of the support element and localized embossing, in a cross-sectional illustration.

The exemplary embodiment of FIG. 16 shows a hollow profile in which the interior width Bh has been reduced in the region of the connection of the initial hollow profile 1.

Figure 17:
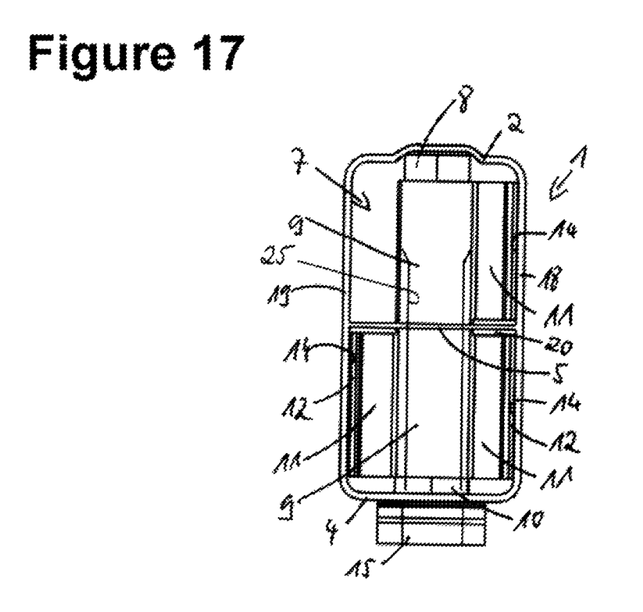
FIG. 17 shows an exemplary embodiment of a hollow profile according to the invention, in a cross-sectional illustration.

The exemplary embodiment of FIG. 17 substantially corresponds to that of FIG. 9, wherein, however, the positioning receptacle 3 here is not configured as an opening. Rather, the positioning receptacle 3 in this case is provided as embossing of the initial hollow profile towards the outside, in which the positioning element 8 of the support element 7 is received in a secure manner.

LIST OF REFERENCE SIGNS

Initial hollow profile
Positioning wall
Positioning receptacle/Positioning opening
Insertion wall
Intermediate wall
Insertion opening
Support element
Positioning element
Bolt element
Engagement element
Support wall
Longitudinal flank
Region
Inner wall
Receptacle part
Centring assembly
Bevel
Side wall
Side wall
Intermediate space
Welded connection
Welded connection
Direction of rotation
Direction of rotation
Interior thread
Bh Interior width
Bs Support width
Ds Diameter of 9

What is claimed is:

1. A hollow profile structure, comprising:
an initial hollow profile and at least one support element, the support element including:
a bolt element;
an engagement element that includes at least one connection element, wherein the at least one connection element has an interior thread;
support walls which are disposed between the bolt element and longitudinal flanks, wherein regions of the longitudinal flanks are connected to the initial hollow profile via inner walls of the initial hollow profile; and
a positioning element that communicates with a positioning receptacle, wherein the positioning receptacle is provided as an embossing of the initial hollow profile or an opening in a wall of the initial hollow profile.

2. The hollow profile structure according to claim 1, wherein the engagement element in the region of an insertion opening is connected to the initial hollow profile in at least one of a force-fitting and a materially integral manner.

3. The hollow profile structure according to claim 2, wherein the engagement element is connected to the initial hollow profile by at least one of welding and adhesive bonding.

4. The hollow profile structure according to claim 1, wherein for centering the support element a receptacle part, by way of a centring assembly, is placed upon the engagement element, and the receptacle part is connected to the initial hollow profile in at least one of a force-fitting and a materially integral manners.

5. The hollow profile structure according to claim 4, wherein the receptacle part is connected to the initial hollow profile by at least one of welding, adhesive bonding, or threading.

6. The hollow profile structure according to claim 1, wherein the initial hollow profile is configured as a single-chamber hollow profile.

7. The hollow profile structure according to claim 1, wherein the initial hollow profile is configured as a multiple-chamber hollow profile.

8. The hollow profile structure according to claim 1, wherein the longitudinal flanks are beveled.

9. The hollow profile structure according to claim 1, wherein the initial hollow profile is configured as a rectangular profile having an interior width (Bh) which corresponds to an effective support width (Bs) of the support element.

10. The hollow profile structure according to claim 9, wherein the interior width (Bh) in the region of the support element is reduced at least in portions.

11. The hollow profile structure according to claim 1, wherein the initial hollow profile is composed of an aluminium alloy of the 6xxx or 7xxx type.

12. The hollow profile structure according to claim 1, wherein the shape of the insertion opening substantially corresponds to the cross-sectional shape of the support element.

13. The hollow profile structure according to claim 1, wherein the positioning receptacle is provided as an embossing of the initial hollow profile.

14. The hollow profile structure according to claim 1, wherein the positioning receptacle is provided as an opening in a wall of the initial hollow profile.

15. A method for manufacturing hollow profiles, comprising:
providing an initial hollow profile which in an insertion wall and optionally in at least one intermediate wall displays an insertion opening;
providing a support element which displays a bolt element, an engagement element, and support walls which are disposed between the bolt element and longitudinal flanks, wherein the engagement element includes at least one connection element, and the at least one connection element as an interior thread,
passing through the support element through the insertion opening until the support walls are positioned in the initial hollow profile and until a positioning element of the support element communicates with a positioning receptacle, wherein the positioning receptacle is provided as an embossing of the initial hollow profile or an opening in a wall of the initial hollow profile;
engaging a tool on the engagement element;
rotating the support element by means of the tool until regions of the longitudinal flanks touch inner walls of the initial hollow profile; and
connecting the regions of the longitudinal flanks to the initial hollow profile via the inner walls.

16. The method according to claim 15, wherein the connection takes place in a materially integral manner by welding or adhesive bonding.

17. The method according to claim 15, wherein the positioning element and/or the engagement element are/is connected to the initial hollow profile in a materially integral manner, for example by welding or adhesive bonding, or in a force-fitting manner by way of threaded means.

18. The method according to claim 15, wherein for centring the support element a receptacle part, by way of a centring assembly, is placed upon the engagement element, and subsequently the receptacle part is connected to the initial hollow profile in a materially integral manner by welding, adhesive bonding, or threaded means.

* * * * *